United States Patent [19]

Burger et al.

[11] Patent Number: 4,996,774

[45] Date of Patent: Mar. 5, 1991

[54] GUIDE BAR FOR THE SAW CHAIN OF A MOTOR-DRIVEN CHAIN SAW AND A METHOD AND APPARATUS FOR PRODUCING THE SAME

[75] Inventors: Uwe Burger, Winnenden; Dieter Unrath, Plüderhausen; Horst Weinhold, Kernen/Stetten, all of Fed. Rep. of Germany

[73] Assignee: Andreas Stihl, Waiblingen, Fed. Rep. of Germany

[21] Appl. No.: 240,817

[22] Filed: Sep. 6, 1988

[30] Foreign Application Priority Data

Sep. 3, 1987 [DE] Fed. Rep. of Germany ....... 3729424

[51] Int. Cl.[5] ...................... B23D 59/04; B23Q 11/12; B26B 7/00

[52] U.S. Cl. .................................... 30/123.4; 30/382; 29/460; 264/278

[58] Field of Search ...................... 30/382, 383, 123.4; 264/278; 29/460; 425/129.1

[56] References Cited

U.S. PATENT DOCUMENTS

| | | | |
|---|---|---|---|
| 3,581,783 | 6/1971 | Sandin | 30/123.4 |
| 4,470,784 | 9/1984 | Piotrovsky | 264/278 X |
| 4,693,005 | 9/1987 | Wehle et al. | 30/383 |
| 4,753,586 | 6/1988 | Curtis | 264/278 X |
| 4,837,934 | 6/1989 | Krohn | 30/383 |
| 4,865,793 | 9/1989 | Suzuki et al. | 264/278 |
| 4,891,175 | 1/1990 | Haines | 264/278 X |

*Primary Examiner*—Hien H. Phan

*Assistant Examiner*—Willmon Fridie, Jr.

*Attorney, Agent, or Firm*—Walter Ottesen

[57] ABSTRACT

The invention is directed to a guide bar which includes a fill body in the guide groove thereof. The fill body is disposed in the region of a lubricating bore and bridges the gap between the bottom of the groove and the rakers of the drive links of the saw chain. The fill body raises the bottom of the groove in the region where lubricant is supplied to the saw chain through the lubricating bore. The fill body has a recess formed at the location of the lubricating bore for receiving lubricant therein. With the invention, the take along of the lubricant by the rakers of the drive links of the saw chain is improved thereby reducing the quantity of lubricant which would otherwise be lost. A method and an apparatus for forming the fill body in the guide groove of the guide bar are also disclosed.

21 Claims, 4 Drawing Sheets

GUIDE BAR FOR THE SAW CHAIN OF A MOTOR-DRIVEN CHAIN SAW AND A METHOD AND APPARATUS FOR PRODUCING THE SAME

FIELD OF THE INVENTION

The invention relates to a guide bar for the saw chain of a motor-driven chain saw. The guide bar has a guide groove extending around its peripheral edge. The saw chain has drive links, cutting side links and connecting side links. The saw chain is guided in the guide groove by means of rakers of the drive links that protrude downwardly beyond the side links and into the groove. The guide bar has at least one bore in a groove wall for supplying lubricant for the saw chain. A fill body is disposed within the guide groove in the region of the lubricating bore. The fill body has an upwardly directed end face defining an elevated segment of the base of the guide groove. A method and apparatus for producing the guide bar are also disclosed.

BACKGROUND OF THE INVENTION

Guide bars of this kind are disclosed in U.S. Pat. Nos. 3,581,783 and 4,693,005. The fill body disposed within the guide groove and arranged in the region of the lubricating bore is provided to bridge the gap between the rakers of the drive links and the groove bottom. This gap is present because of manufacturing reasons and assures a jam-free passage of the drive links through the guide groove. The fill body defines an elevated segment of the groove bottom in the region of the lubricating bore so that the supplied lubricant is taken up by the rakers as completely as possible and thereafter is directed to the pivot joints of the saw chain. It is intended to prevent the accumulation of large quantities of lubricant on the groove bottom in this manner which would otherwise be lost for the purpose of lubrication.

In known guide bars, the fill body is configured so that it partially overlaps the lubricating bore within the guide groove whereby the metering of lubricant is made difficult. The fill body disclosed in U.S. Pat. No. 3,581,783 is configured to be convex at its end face directed outwardly whereby the lubricant, which is usually lubricating oil, runs off in the direction toward the groove bottom at both sides of the lubricating bore. In this way, a considerable quantity of the lubricating oil reaches the groove bottom without being grasped by the rakers of the drive links.

U.S. Pat. No. 4,693,005 discloses an embodiment wherein the end face of the fill body which defines the elevated segment of the groove bottom is level and by means of which an improved take-along function of the drive links is achieved. However, because of the very rapid movement of the saw chain, a part of the lubricating oil is nonetheless directed to the groove bottom because the rakers of the drive links displace the lubricating oil on the end face of the fill body directly after the oil exits through the lubricating bore toward the groove bottom.

A further problem in the manufacture of the guide bar is that the depth of the guide groove varies within very large manufacturing tolerances. In contrast thereto, the fill body has the same elevation for all guide bars of the same type because of manufacturing reasons so that in dependence upon the manufacturing tolerances of the guide bar, a more or less large gap exists between the rakers of the drive links and the end face of the fill body defining the elevated segment of the groove bottom. The intended effect of the take-along of lubricating oil is therefore subjected to large variations among guide bars and this effect can become lost in dependence upon the particular guide bar. A gap of a certain width between the raker of the drive link and the end face of the fill body is to be deliberately provided because the drive links dip deeper into the guide groove in dependence upon increasing wear of the side links of the saw chain so that the fill body can then become a restriction for the through-passage of the drive links.

SUMMARY OF THE INVENTION

It is an object of the invention to provide a guide bar wherein the function of the drive links to take along the lubricant is improved. It is a further object of the invention to provide a method and apparatus by means of which the fill body is produced so that it is adapted to the lubricating bore and the dimensions of the guide groove.

The guide bar of the invention is for guiding a saw chain of a motor-driven chain saw as the saw chain is driven. The saw chain includes a plurality of cutting side links, a plurality of connecting side links and a plurality of drive links. The links are pivotally interconnected by rivets or the like and each of the drive links has a raker extending downwardly beyond the side links and the rakers have respective lowermost tips. The guide bar comprises: a flat bar having a peripheral edge; the guide bar having two mutually adjacent walls extending along the peripheral edge to conjointly define a groove for receiving the rakers of the drive links therein to guide the saw chain in its movement around the guide bar, the groove having a groove bottom extending between said walls and located at a predetermined distance beneath the tips of the rakers; the groove walls having respective upper edges defining respective supporting surfaces for receiving the side links in supporting contact engagement therewith as the saw chain moves around the guide bar; at least one lubricating bore formed in the guide bar so as to be transverse to the plane, the lubricating bore opening into the guide groove for conducting a lubricant into the latter; a fill body disposed in the guide groove in the region of the lubricating bore, the fill body having an upwardly directed end face defining an elevated segment of the groove bottom; and, recess means formed in the end face of the fill body in the region of the bore for receiving lubricant therein.

The recess means of the fill body provided in the region of the lubricating bore assures that a relatively large quantity of lubricant and especially lubricating oil is supplied which can in part collect in the recess means and can then be taken along by the rakers of the drive links so that first a lubricating film is formed which migrates in the direction of the pivot joints of the saw chain. The recess means substantially prevents the inflowing lubricant from being immediately ripped along by the rapidly moving drive links and then reaching the groove bottom so that this oil quantity would be lost for the lubrication.

It is especially advantageous if the recess in the fill body is so configured that the lubricating bore is fully exposed and partially surrounded by the fill body. In this way, the lubricant is especially advantageously taken up by the rakers of the drive links because these rakers usually have an arc-shaped cutout formed in the forward edge thereof facing in the direction of movement of the saw chain around the guide bar. Each drive link reaching the fill body then encloses the metered oil with its arcuate edge together with the recess of the fill body at the instant of the take-up so that the lubricant remains in the region of the drive link and does not escape to the groove bottom during the further forward movement.

According to a feature of the invention, the fill body is made of cured adhesive based on synthetic resin and preferably on epoxy resin. This material not only permits a trouble-free manufacture; rather, it also affords the advantage that a rub-off occurs when the raker of the drive link comes into contact with the fill body. This takes into account the wear of the side links which determine the engaging depth of the drive links in the guide groove because of their contact engagement on the outer supporting surfaces of the guide bar. Accordingly, no gap of a specific minimum size must therefore be provided between the rakers of the drive links and the end face of the fill body.

The method for producing the guide bar according to the invention is based upon the premise that the fill body can be injection-molded in the guide groove of the previously manufactured guide bar as indicated in U.S. Pat. No. 4,693,005. However, there was no method previously known by means of which the injection of the fill body was possible such that the latter had the desired form after curing of the injection molding compound.

By utilizing an insert piece which covers the lubricating bore within the guide groove entirely or partially, the injection molding compound can be brought directly to the region of the lubricating bore and the fill body has such a form that it does not plug the lubricating bore after removal of the insert piece and after curing.

It is advantageous to close off the region of the guide groove above the lubricating bore and laterally thereof with the insert piece with the space for the fill body remaining. The injecting molding compound is then introduced through the insert piece and into the guide groove. This makes it possible to provide a precise contour of the fill body.

According to another feature of the invention, the insert piece is part of a tool which includes a tool holder for manipulation during insertion of the insert piece into the guide groove. This tool makes it possible to serially produce the fill body by machine. The insert piece can then be adapted to the dimensions of the drive links so that the spacing between the end face of the fill body defining the elevated segment of the groove bottom to the outer edge of the guide bar corresponds with substantial precision to the engaging depth of the drive links. The height of the fill body can therefore be varied in the series manufacture of a specific guide bar type in accordance with the tolerance variations which are given for the depth of the guide groove. It is in this way always assured that the rakers of the drive links extend to close to the end face of the fill body thereby seizing and taking along the lubricant substantially without loss.

It is especially advantageous to configure the tool as an injection head so that the injection molding compound can be delivered into the guide groove by passing the same through the tool.

BRIEF DESCRIPTION OF THE DRAWINGS

The invention will now be described with reference to the drawings wherein.

DESCRIPTION OF THE PREFERRED EMBODIMENT OF THE INVENTION

Figure 1:
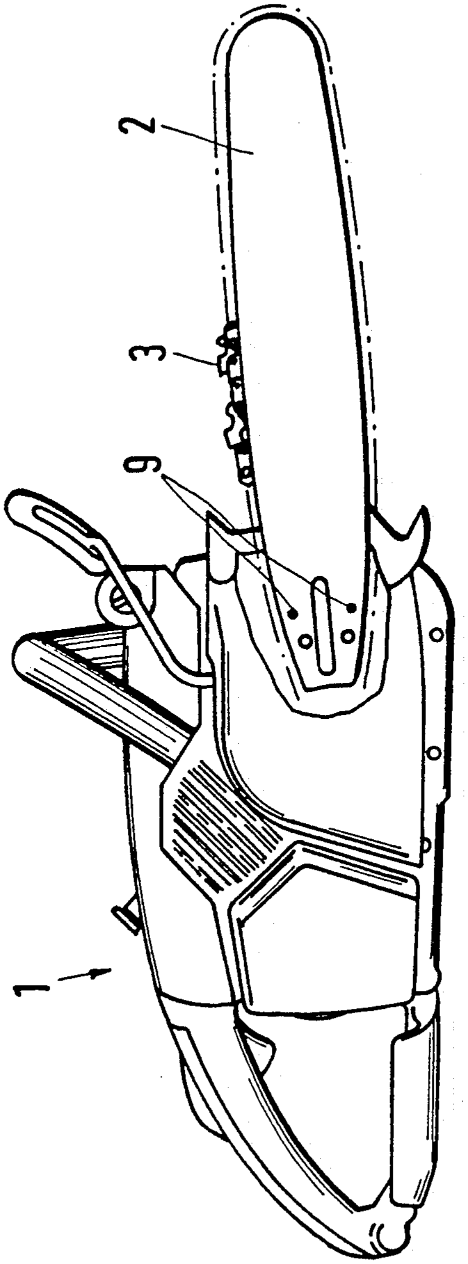
FIG. 1 is a side elevation view of a motor-driven chain saw equipped with a guide bar according to the invention.

FIG. 1 is a schematic representation of a motor-driven chain saw 1 having a guide bar 2 which is releasably attached to the body of the chain saw. A saw chain 3 runs on the edge of the guide bar 2 in the direction of arrow P.

Figure 2:
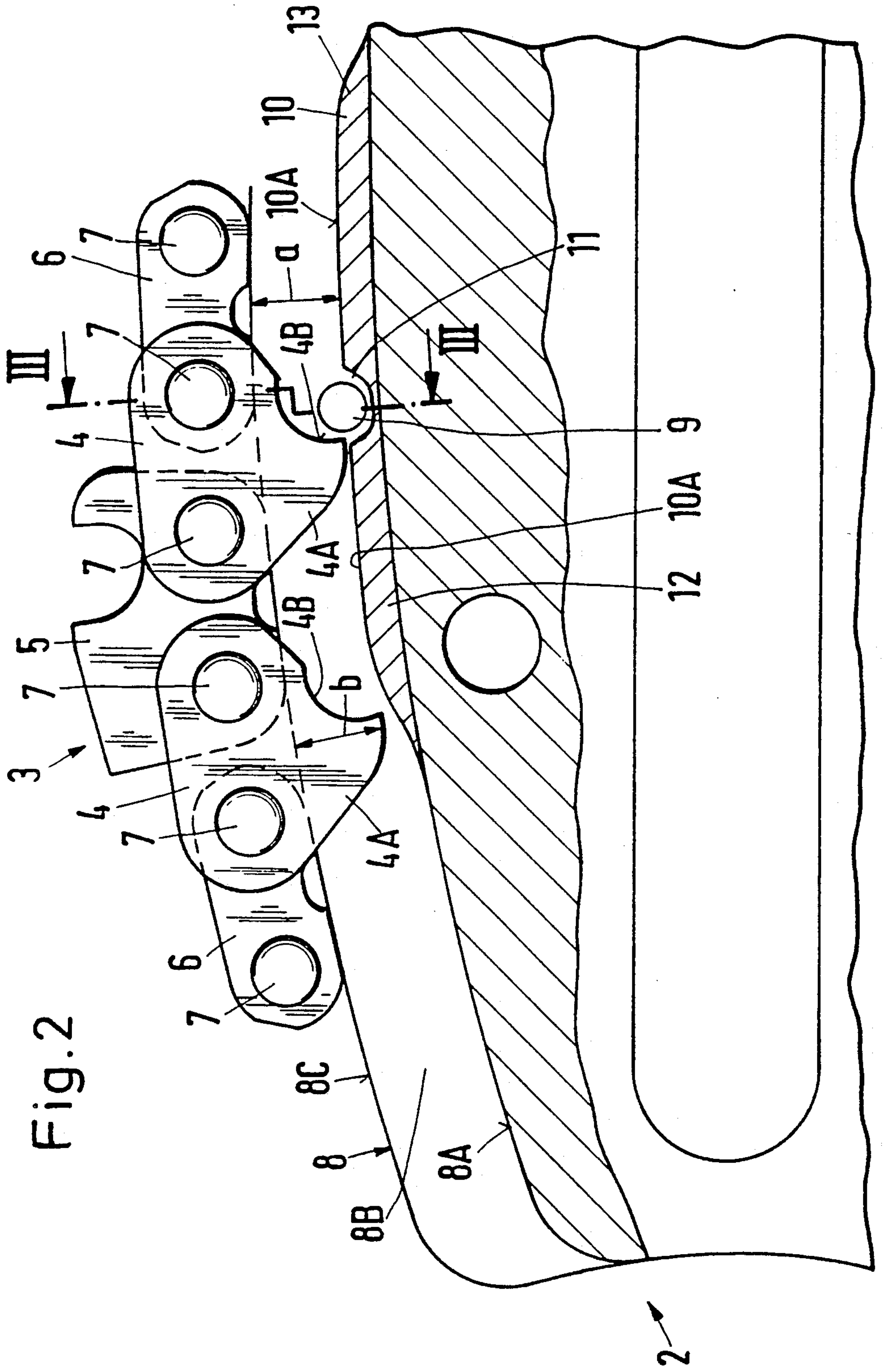
FIG. 2 shows a portion of the rear end of the guide bar according to the invention drawn in enlarged scale and is taken in the region of the guide groove with the portion of the guide bar being shown in section taken in the longitudinal center plane of the guide bar.

As shown in FIG. 2, the saw chain 3 includes the conventional drive links 4 disposed centrally between side links 5 and 6. The drive links each have a raker 4A which engages in the guide groove 8 of the guide bar 2. In the section view of FIG. 2, only those side links are shown which lie on the one outer edge surface 8C. These side links are here shown as cutting side links 5 and as connecting side links 6 and are pivotally connected with the drive links by means of rivets 7 as shown also in FIG. 3.

The guide groove 8 is defined by the groove bottom 8A as well as the two groove walls 8B having respective edge surfaces 8C which serve as corresponding support surfaces for the side links 5 and 6 which run therealong. The rakers 4A of the drive links 4 do not extend to the groove bottom 8A as shown in FIG. 2. This is caused in the first instance by the manufacturing tolerances because the guide groove in the guide bar is usually milled into the latter with the guide bar being constructed mostly as a single piece. In this situation, variations in the groove depth up to 30% can occur.

Figure 3:
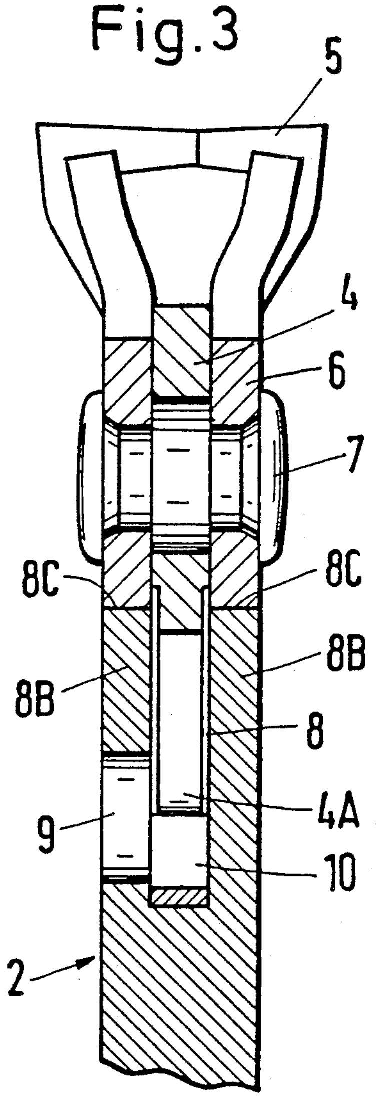
FIG. 3 is a section view taken along line III—III of FIG. 2.

The guide bar 2 is penetrated by two lubricating bores 9 in the region of its rearward end with both bores lying perpendicular to the plane of the guide bar. The lubricating bores 9 are shown in FIGS. 1 and 2 and are disposed in the region of the guide groove 8 close to the groove bottom 8A. The lubricating bores 9 penetrate one of the two groove walls 8B as shown in FIG. 3. The lubricating bores can also be configured to penetrate both groove walls. Likewise, it is possible to provide only one lubricating bore 9.

As shown in FIG. 2, a fill body 10 is disposed within the guide groove in the region of the lubricating bore 9 and is seated on the groove bottom 8A and defines an elevated segment of the groove bottom with its end face 10A. This end face 10A is even and extends approximately parallel to the groove bottom. The end face 10A is recessed approximately at its center so that the lubricating bore 9 is exposed. However, the recess could also be configured to have a lesser depth in which case the lubricating bore 9 would be partially covered. It is, however, especially advantageous if the edge of the recess formed by the cutout 11 has a partially circular contour surrounding the bore 9 so that this edge continues in the curve-shaped edge of the drive link 4 when the latter is in the position shown in FIG. 2. The curve-shaped edge 4B is formed in the leading edge of the raker 4A of the drive link 4.

The cutout 11 in the fill body 10 can be so configured that the portions 12 and 13 lying at both sides of the lubricating bore 9 are separated with the groove bottom being exposed beneath the center of the bore 9. The end face 10A of the fill body 10 extends continuously downward to the groove bottom 8A. This is caused by the manner of manufacture as will be shown in greater detail below.

The spacing (a) between the end face 10A of the fill body and the edge faces 8C of the groove walls 8B which serve as supporting surfaces is so dimensioned that it corresponds approximately to the elevation (b) of the raker 4A of the drive link 4. The rakers 4A therefore run past the fill body very closely over the end face 10A thereof. The extent of the fill body 10 in the running direction of the saw chain 3 should be a multiple of the bore diameter to ensure that the lubricating oil is distributed over the drive link up to the pivots 7 of the chain before the drive link leaves the elevated segment 10A of the groove bottom. This extent can, for example, amount to 5 to 8 times the bore diameter at both sides of the lubricating bore 9.

Figure 4:
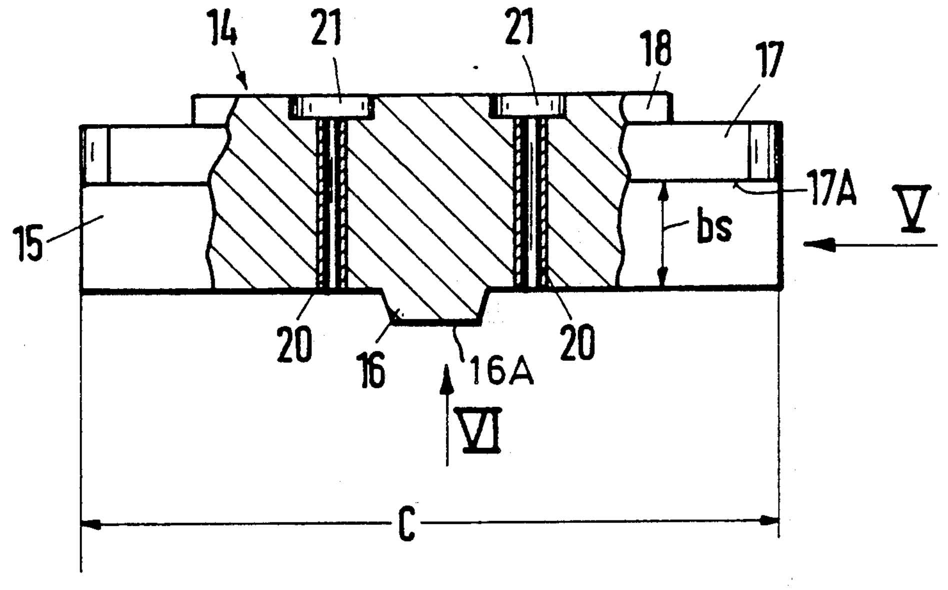
FIG. 4 is a side elevation view, partially in section, of the tool used to produce the fill body.
Figure 6:
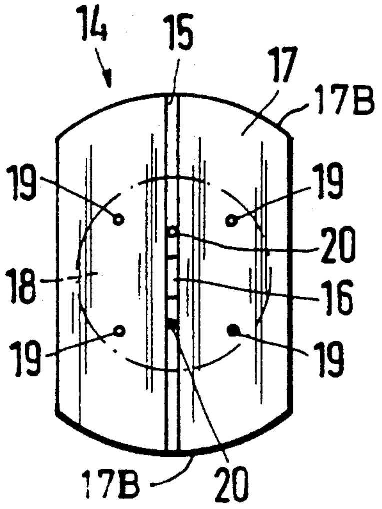
Figure 5:
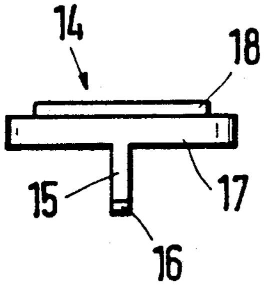
FIG. 5 is a view of the tool of FIG. 4 viewed in the direction of arrow V of FIG. 4; and, FIG. 6 is a view of the tool of FIG. 4 viewed in the direction of arrow VI.

FIGS. 4 to 6 show a tool 14 which is configured as an injection head and is used to form the fill body 10 in the guide groove 8. The injection head 14 is produced from plastic as a single piece and comprises an upper plate 17 which serves as a holder. The injection head 14 includes a narrow bar 15 which extends outwardly from the one surface 17A of the plate 17. The injection head is seated in the guide groove 8 by means of the narrow bar 15. The bar 15 has an extension 16 arranged centrally thereon which covers the lubricating bore 9 when the injection head is mounted on the guide bar ready for use. When the injection head is seated in place as described, only a narrow gap exists between the base surface 16A of the extension 16 and the groove bottom 8A. The upper plate 17 is elongated and rounded at its longitudinal end faces 17B and has a circular head plate 18. In the region of this head plate 18, the holder is penetrated by four receiving bores 19 which engage pins of a tool holder (not shown). In this way, the injection head can be connected with the tool holder of a machine and is lowered and raised in clocked sequence in order to continuously provide fill bodies into the guide bars which are likewise moved in clocked sequence.

In the region of the bar 15, the injection head includes two thin bores which pass through the latter in which respective metal tubes 20 are seated. These metal tubes act as injection molding nozzles which open at respective sides of the extension 16 in the bar 15. The injection nozzles have respective inlet openings which are disposed in two corresponding recesses 21 formed in the head plate 18 and are used for connecting to the metering means through which the injection molding compound is supplied to the injection nozzles.

The injection head is seated in the guide groove with the bar 15 defining the insert piece with the surface 17A of the upper plate 17 defining a seating surface which lies upon the end faces 8C of the groove walls 8B. The elevation (bs) of the bar 15 is so dimensioned that it corresponds to the elevation (b) of the rakers 4A of the drive links 4. This assures that the fill body 10 is adjusted with respect to its elevation to the depth of the guide groove 8 so that there is always only a narrow gap between the rakers 4A and the end face 10A of the fill body 10.

The injection molding mass is made of an adhesive having an epoxy resin base which is matched to the material of the injection head with respect to its characteristics so that the injection head can be easily separated therefrom after the injection molding compound is placed at the bottom of the guide groove. The adhesive cures rapidly to ensure a correct formation of the fill body during the time that the injection head is utilized. The injection molding compound is delivered into the groove at both sides of the extension 16 and thereby at both sides of the lubricating bore 9 with the injection molding compound distributing itself beneath the bar 15 so that the end face 10A of the fill body is formed. At the ends of the bar 15 lying in the direction of movement of the chain, the adhesive flows in the direction toward the groove bottom 8A with a continuous transition of the end face 10A to the groove bottom as shown in FIG. 2. In this way, the length (c) of the bar 15 is so selected that it is larger than the longitudinal length of the fill body 10.

It is understood that the foregoing description is that of the preferred embodiments of the invention and that various changes and modifications may be made thereto without departing from the spirit and scope of the invention as defined in the appended claims.

What is claimed is:

1. A guide bar for guiding a saw chain of a motor-driven chain saw as the saw chain is driven, the saw chain including a plurality of cutting side links, a plurality of connecting side links and a plurality of drive links, the links being pivotally interconnected by rivets or the like and each of the drive links having a raker extending downwardly beyond the side links, the rakers having respective lowermost tips, the guide bar comprising:

- a flat bar defining a plane and having a peripheral edge;
- said guide bar having two mutually adjacent walls extending along said peripheral edge to conjointly define a groove for receiving the rakers of said drive links therein to guide the saw chain in its movement around the guide bar, the groove having a groove bottom extending between said walls and located at a predetermined distance beneath said tips of said rakers;
- said groove walls having respective upper edges defining respective supporting surfaces for receiving said side links in supporting contact engagement therewith as said saw chain moves around said guide bar;
- at least one lubricating bore formed in said guide bar so as to be transverse to said plane, said lubricating bore opening into said guide groove for conducting a lubricant into the latter;
- a fill body disposed in said guide groove in the region of said lubricating bore, said fill body having an upwardly directed end face defining an elevated segment of said groove bottom; and,
- said fill body having a recess formed in said end face in the region of said bore so as to extend across said groove between side walls and to extend downwardly into said fill body to a depth sufficient to permit said bore to open into said recess.

2. The guide bar of claim 1, said recess being a cutout in the region of said lubricating bore.

3. The guide bar of claim 2, said cutout extending down to said groove bottom so as to subdivide said fill body into two component fill bodies on respective sides of said bore.

4. The guide bar of claim 1, said bore extending through one of said mutually adjacent walls to define a peripheral edge facing into said groove; and, said recess defining a surface having a contour configured so as to flank a portion of said peripheral edge.

5. The guide bar of claim 4, said contour corresponding to a portion of the circumference of a circle.

6. The guide bar of claim 1, said upper edges being spaced said end face of said fill body a distance which is adapted to the height of said rakers; and, said bore having a predetermined diameter and said fill body having a length extending in the direction of the movement of the saw chain corresponding to a multiple of said diameter.

7. The guide bar of claim 1, said fill body being made of a cured adhesive based on a synthetic resin.

8. The guide bar of claim 1, said fill body being made of cured adhesive based on an epoxy resin.

9. The guide bar of claim 1, wherein a portion of said peripheral edge is on the upper side of said guide bar and an other portion of said peripheral edge is on the lower side of said guide bar, said plane being a center plane extending parallelly to said groove walls at both of said peripheral edge portions; and, said guide bar comprising: two of said lubricating bores extending perpendicularly to said plane in respective ones of said portions of said peripheral edge; and, two of said fill bodies corresponding to respective ones of said bores.

10. A method of producing a guide bar for guiding a saw chain of a motor-driven chain saw, the guide bar being prefabricated as a flat member having two mutually adjacent walls formed on its peripheral edge to conjointly define a guide groove for engaging the drive links of the saw chain to guide the latter, the guide bar also having at least one lubricating bore formed in at least one of said walls so as to open into the guide groove; the method comprising the steps of:

introducing an insert piece into the guide groove so as to at least partially close off said lubricating bore;

injecting injection molding compound into the groove to form a fill body having a recess formed therein so as to extend across the groove at the lubricating bore and so as to cause the fill body to extend along the bottom of the groove so as to have an end face defining an elevated segment of the groove bottom; and, withdrawing the insert piece directly after injecting the molding compound and allowing the latter to cure.

11. The method of claim 10, said insert piece being dimensioned so as to close off the region above and to the side of the bore; and, the insert piece having injection nozzle means formed therein for introducing the injection molding compound into the groove.

12. An apparatus for carrying out a method of producing a fill body in a guide bar for guiding a saw chain of a motor-driven chain saw, the guide bar being prefabricated as a flat member having two mutually adjacent walls formed on its peripheral edge to conjointly define a guide groove for engaging the drive links of the saw chain to guide the latter, the guide bar also having at least one lubricating bore formed in at least one of said walls so as to open into the guide groove; the apparatus comprising:

an insert piece having an upper end and a lower portion extending downwardly from said upper end for insertion downwardly into the guide groove so as to at least partially close off the lubricating bore and so as to define gap means between said insert piece and the bottom of the groove;

manipulating means for manipulating the insert piece when introducing the latter into said groove;

stop means for contact engaging the upper edges of said walls for limiting the depth of penetration of said lower portion in the groove; and, injection nozzle means for injecting a molding compound into said gap means for forming the fill body in the latter.

13. An apparatus for carrying out a method of producing a fill body in a guide bar for guiding a saw chain of a motor-driven chain saw, the guide bar being prefabricated as a flat member having two mutually adjacent walls formed on its peripheral edge to conjointly define a guide groove for engaging the drive links of the saw chain to guide the latter, the guide bar also having at least one lubricating bore formed in at least one of said walls so as to open into the guide groove; the apparatus comprising:

an insert piece having an upper end and a lower portion extending downwardly from said upper end for insertion downwardly into the guide groove so as to at least partially close off the lubricating bore and so as to define gap means between said insert piece and the bottom of the groove;

manipulating means for manipulating the insert piece when introducing the latter into said groove;

injection nozzle means for injecting a molding compound into said gap means for forming the fill body in the latter;

said manipulating means being a member having a surface means formed thereon for contact engaging the upper edges of said walls when introducing said insert piece into the guide groove; and, said insert piece being a bar extending approximately perpendicularly to said surface means.

14. The apparatus of claim 13, wherein the saw chain includes a plurality of cutting side links, a plurality of connecting side links and a plurality of drive links, the links being pivotally interconnected by rivets or the like and each of the drive links having a raker extending downwardly beyond the side links for engaging the groove during the movement of the saw chain around the guide bar; and, said bar having a predetermined length extending parallelly to said surface means and having a depth (bs) corresponding to the elevation (b) of the raker substantially over the entire extent of said length.

15. The apparatus of claim 14, said length (c) of said bar being greater than the length of the fill body.

16. The apparatus of claim 14, said bar having an extension formed thereon approximately at the center of said length; said extension being configured so that it closes off the lubricating bore when said bar is introduced into the guide groove.

17. The apparatus of claim 13, wherein the apparatus is manipulated by a tool having a tool holder, said manipulating means being a plate having receiving bores formed therein for accommodating the tool holder.

18. The apparatus of claim 17, said plate being elongated and having a surface facing away from said surface means; and, said apparatus further comprising a circular top plate formed on said surface and having a plurality of bores formed therein for receiving the tool holder.

19. The apparatus of claim 12, comprising a plastic defining at least a portion of said insert piece, said plastic being matched to the injection molding compound for producing the fill body such that said bar is easily separable from the injection molding compound after the latter has been injected into said gap means.

20. The apparatus of claim 19, said apparatus being a single integral piece made of said plastic.

21. The apparatus of claim 12, said injection nozzle means comprising at least one injection nozzle extending through said manipulating means and said insert piece so as to communicate with said gap means.

* * * * *

UNITED STATES PATENT AND TRADEMARK OFFICE

CERTIFICATE OF CORRECTION

PATENT NO. : 4,996,774

DATED : March 5, 1991

INVENTOR(S) : Uwe Burger, Dieter Unrath and Horst Weinhold

It is certified that error appears in the above-identified patent and that said Letters Patent is hereby corrected as shown below:

In column 4, line 23: delete "EMBODIMENT" and substitute -- EMBODIMENTS -- therefor.

In column 6, line 68: delete "side" and substitute -- said -- therefor.

In column 7, line 17: between "spaced" and "said" insert -- from --.

Signed and Sealed this

Twenty-third Day of June, 1992

*Attest:*

DOUGLAS B. COMER

*Attesting Officer* *Acting Commissioner of Patents and Trademarks*